(12) United States Patent
Prendergast et al.

(10) Patent No.: US 9,794,002 B1
(45) Date of Patent: Oct. 17, 2017

(54) INTEGRATED MULTIPLEXED RF-TO-OPTICAL INTERCONNECT FOR PORTABLE ELECTRONIC DEVICES

(71) Applicant: DELL PRODUCTS, LP, Round Rock, TX (US)

(72) Inventors: Liam Prendergast, Limerick (IE); Gerald R. Pelissier, Mendham, NJ (US); Liam B. Quinn, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 25 days.

(21) Appl. No.: 15/077,726

(22) Filed: Mar. 22, 2016

(51) Int. Cl.
*H04B 10/80* (2013.01)
*H04L 25/02* (2006.01)

(52) U.S. Cl.
CPC ......... *H04B 10/801* (2013.01); *H04L 25/026* (2013.01)

(58) Field of Classification Search
CPC .............................. H04B 10/80; H04B 10/801
See application file for complete search history.

(56) References Cited

U.S. PATENT DOCUMENTS

| | | | |
|---|---|---|---|
| 7,817,960 B2 | 10/2010 | Tan et al. | |
| 8,046,583 B2 | 10/2011 | Taniguchi | |
| 8,462,751 B1 | 6/2013 | Dehghan et al. | |
| 2005/0239451 A1 | 10/2005 | Periyalwar et al. | |
| 2009/0232243 A1 | 9/2009 | Tsuboi et al. | |
| 2010/0056132 A1 | 3/2010 | Gallagher | |
| 2010/0159957 A1 | 6/2010 | Dando et al. | |
| 2011/0001658 A1 | 1/2011 | Noble et al. | |
| 2011/0164580 A1 | 7/2011 | Keon | |
| 2011/0205941 A1 | 8/2011 | Stanforth | |
| 2011/0261735 A1 | 10/2011 | Cordeiro | |
| 2012/0302273 A1 | 11/2012 | Lin et al. | |
| 2013/0095845 A1 | 4/2013 | Lim et al. | |
| 2013/0288689 A1 | 10/2013 | Choi-grogan et al. | |
| 2014/0035836 A1* | 2/2014 | Cui ....................... | G06F 3/0421 345/173 |
| 2015/0215044 A1 | 7/2015 | Cvijetic et al. | |
| 2017/0163946 A1* | 6/2017 | Komanduri .......... | H04N 9/3155 |

* cited by examiner

*Primary Examiner* — Shi K Li
(74) *Attorney, Agent, or Firm* — Larson Newman, LLP

(57) ABSTRACT

An information handling system, a display panel, and a method for providing optical communication of signals within a display panel is provided. The information handling system comprises a radio frequency (RF) transceiver subsystem, an antenna subsystem, and a display panel, the display panel for displaying graphic images, the display panel comprising an optical communication channel coupled to the RF transceiver subsystem and the antenna subsystem, the optical communication channel for communicating transmit signals from the RF transceiver subsystem to the antenna subsystem and for communicating receive signals from the antenna subsystem to the RF transceiver subsystem.

20 Claims, 4 Drawing Sheets

INTEGRATED MULTIPLEXED RF-TO-OPTICAL INTERCONNECT FOR PORTABLE ELECTRONIC DEVICES

FIELD OF THE DISCLOSURE

The present disclosure generally relates to information handling systems, and more particularly relates to a multiplexed RF-to-optical interconnect for portable electronic devices.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system, a display panel, and a method for providing optical communication of signals within a display panel are provided. The information handling system comprises a radio frequency (RF) transceiver subsystem, an antenna subsystem, and a display panel. The display panel displays graphic images and includes an optical communication channel coupled to the RF transceiver subsystem and the antenna subsystem. The optical communication channel communicates transmit signals from the RF transceiver subsystem to the antenna subsystem, and communicates receive signals from the antenna subsystem to the RF transceiver subsystem.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
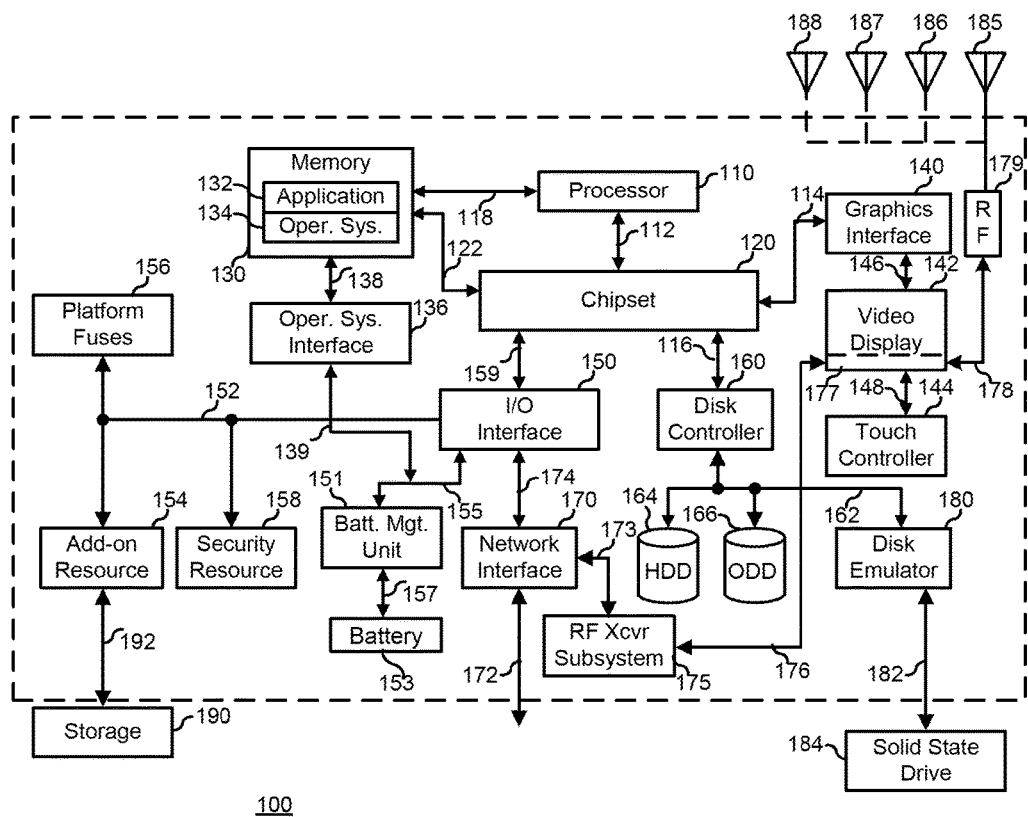
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processor 110, a chipset 120, a memory 130, a graphics interface 140, include an operating system interface 136, a disk controller 160, a disk emulator 180, an input/output (I/O) interface 150, and a network interface 170. Processor 110 is connected to chipset 120 via processor interface 112. Processor 110 is connected to memory 130 via a memory bus 118. Memory 130 is connected to chipset 120 via a memory bus 122. Memory 130 comprises memory storing an application 132 and memory storing an operating system 134. Memory 130 is connected to operating system interface 136 by operating system interface connection 138. Operating system interface 136 is connected to a connection 155 between I/O interface 150 and battery management unit 151 by connection 139. Battery management unit 151 is connected to battery 153 via battery connection 157. Graphics interface 140 is connected to chipset 120 via a graphics interface 114, and provides a video display output 146 to a video display 142. Video display 142 is connected to a touch controller 144 via touch controller connection 148. An example of memory 130 includes random access memory (RAM) such as static RAM (SRAM), dynamic RAM (DRAM), non-volatile RAM (NV-RAM), or the like, read only memory (ROM), another type of memory, or a combination thereof.

Disk controller 160 is connected to chipset 120 via disk controller interface 116. I/O interface 150 is connected to chipset 120 via an I/O channel 159. An example of I/O channel 166 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 120 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof.

Disk controller 160 includes a disk interface 162 that connects the disc controller to a hard disk drive (HDD) 164, to an optical disk drive (ODD) 166, and to disk emulator 180. An example of disk interface 162 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 180 permits a solid-state drive 184 to be connected to information handling system 100 via an external interface 182. An example of external interface 162 includes a USB interface, an IEEE 1194 (Firewire) interface, a proprietary interface, or a combination thereof. Alternatively, solid-state drive 184 can be disposed within information handling system 100.

I/O interface 150 is connected to a network interface 170 via connection 174. Network interface 170 connects to a network via network connection 172. I/O interface 150 includes a peripheral interface 152 that connects the I/O interface to an add-on resource 154, to a security resource 158, and to platform fuses 156. Add-on resource 154 can connect to, for example, external storage 190 via external connection 192. Peripheral interface 152 can be the same type of interface as I/O channel 159, or can be a different type of interface. As such, I/O interface 170 extends the capacity of I/O channel 159 when peripheral interface 152 and the I/O channel are of the same type, and the I/O interface translates information from a format suitable to the I/O channel to a format suitable to the peripheral channel 152 when they are of a different type. Add-on resource 154 can include a data storage system, an additional graphics interface, a network interface card (NIC), a sound/video processing card, another add-on resource, or a combination thereof. Add-on resource 154 can be on a main circuit board, on separate circuit board or add-in card disposed within information handling system 100, a device that is external to the information handling system, or a combination thereof.

Network interface 170 represents a NIC disposed within information handling system 100, on a main circuit board of the information handling system, integrated onto another component such as chipset 110, in another suitable location, or a combination thereof. Network interface device 170 includes network channel 172 that provides an interface to devices that are external to information handling system 100. In a particular embodiment, network channel 172 is of a different type than peripheral channel 152 and network interface 170 translates information from a format suitable to the peripheral channel to a format suitable to external devices. An example of network channel 172 includes InfiniBand channels, Fibre Channel channels, Gigabit Ethernet channels, proprietary channel architectures, or a combination thereof. Network channel 172 can be connected to external network resources (not illustrated). The network resource can include another information handling system, a data storage system, another network, a grid management system, another suitable resource, or a combination thereof.

Network interface 170 can support wireless communications, for example, via a radio frequency (RF) transceiver subsystem 175 which is connected to network interface 170 via interconnect 173. RF transceiver subsystem 175 is connected to an antenna subsystem. The antenna subsystem comprises an RF front end 179 and one or more antennas 185, 186, 187, and 188. RF transceiver subsystem 175 is connected via interface 176 to an optical waveguide 177, which is connected via interface 178 to RF front end 179. RF front end 179 is connected to one or more antennas 185, 186, 187, and 188. As other examples, RF transceiver subsystem 175 can be connected directly to I/O interface 150, bypassing network interface 170, or directly to chipset 120, bypassing network interface 170 and I/O interface 150.

As an example, optical waveguide 177 can be disposed within video display 142, for example, in a portion of video display 142 exhibiting optical transparency over at least a relevant range of wavelengths along a path from interface 176 to interface 178. Multiple instances of optical waveguide 177 can be provided to support communication to and from multiple RF front ends 179. Multiple instances of optical waveguide 177 can be provided to support communication to and from multiple RF transceiver subsystems 175. Optical waveguide 177 can support communication in multiple RF bands of frequencies, according to multiple protocols, and for multiple purposes.

Figure 2:
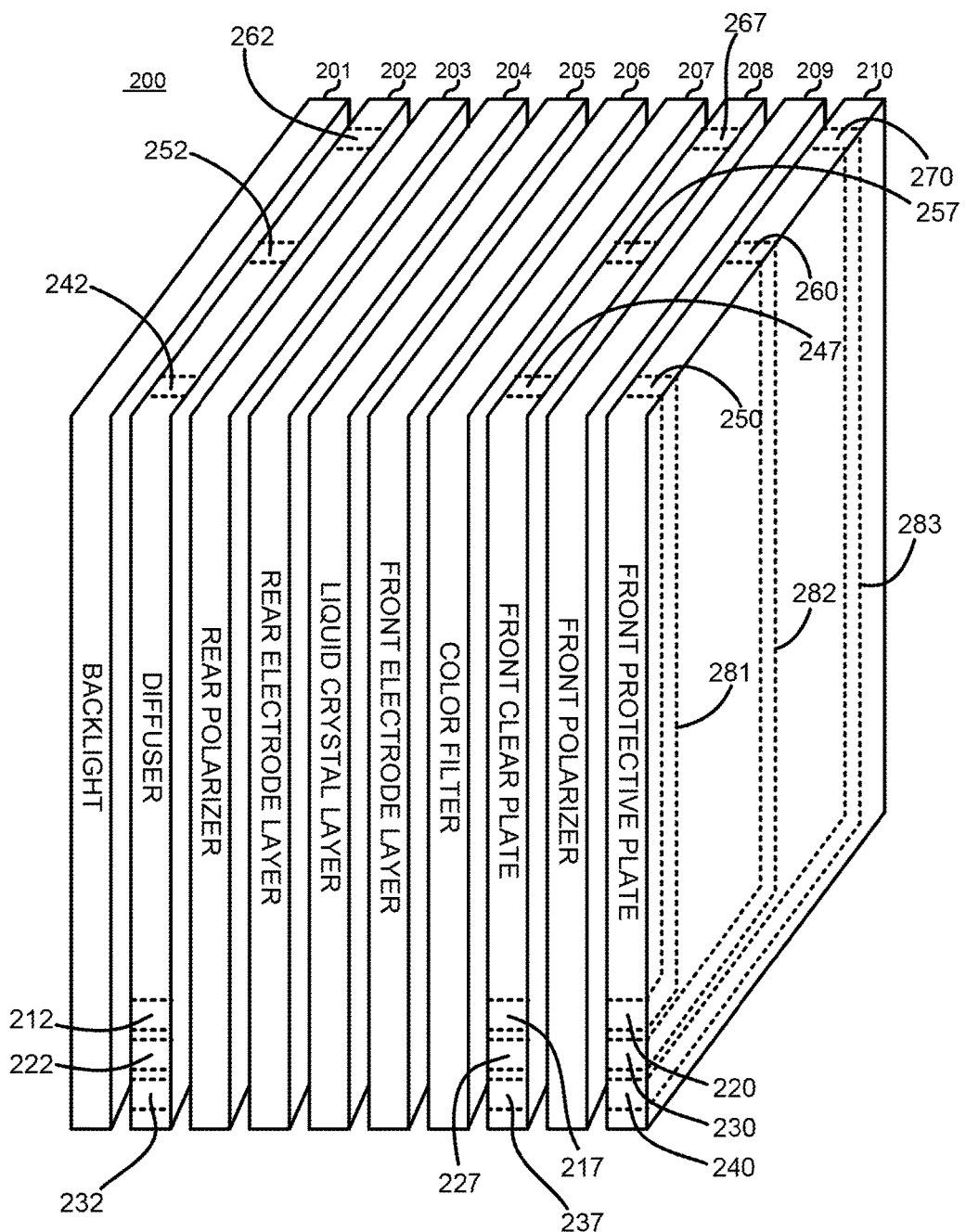
FIG. 2 is an exploded perspective of a display panel according to an embodiment of the present disclosure.

FIG. 2 shows a display panel 200 that has a plurality of layers. Such layers can include, for example, backlight layer 201, diffuser layer 202, rear polarizer layer 203, rear electrode layer 204, liquid crystal layer 205, front electrode layer 206, color filter layer 207, front clear plate layer 208, front polarizer layer 209, and front protective plate 210. Backlight layer 201 provides light, which passes to diffuser layer 202. Diffuser layer 202 diffuses the light to provide an even level of consistent illumination over the area of pixels which form the image to be displayed on the display panel. Diffuse light passes from diffuser layer 202 to rear polarizer layer 203. Rear polarizer layer 203 polarizes the light such that polarized light is aligned with an axis with respect to which a liquid crystal axis of liquid crystal material of liquid crystal layer 205 can be adjusted to control transmission of the light. Polarized diffuse light passes from rear polarizer layer 203 through rear electrode layer 204. Rear electrode layer 204 provides transparent electrodes to control an electric field applied to liquid crystal layer 205 to control the orientation of the liquid crystal material. Rear electrode layer 204 can include active elements, such as thin film transistors (TFTs) to actively control the electric field on a per-pixel or per-sub-pixel basis. Front electrode layer 206 works cooperatively with rear electrode layer 204 to control the electric field applied to liquid crystal layer 205. An image is generated by the patterns of electric fields controlling the orientation of the liquid crystal material of liquid crystal layer 205 to control transmission of light, which forms an image based on different amounts of light transmitted for different areas of the image. The light of the image passes through front electrode layer 206 and through color filter layer 207. Color filter layer 207 filters the light, allowing the color of the light to be controlled. For example, color filter layer 207 can filter the light according to primary color filters, such as red, green, and blue filters. Controlled amounts of red, green, and blue filtering can determine any color within a spectrum of visible colors for any point in the image. Light from color filter layer 207 passes through front clear plate layer 208. Front clear plate layer 208 can be, for example, a front clear glass plate. Light from front clear plate layer 208 passes through front polarizer layer 209. Front polarizer layer 209 cooperates with rear polarizer layer 203 and liquid crystal layer 205 to control the transmission of light based on the respective axes with which the materials of the respective layers are aligned. Light from front polarizer layer 209 passes through front protective plate layer 210. Front protective plate layer provides a transparent surface that protects the underlying layers of the display panel.

One or more optical transmission paths for optical communication between at least one RF transceiver subsystem and at least one antenna subsystem can be provided in at least one layer of a display panel. As an example, an optical transmission path 281 can be provided in front protective plate layer 210 between RF transceiver subsystem interface 220 and antenna subsystem interface 250. As another example, a second optical transmission path 282 can be provided in front protective plate layer 210 between second RF transceiver subsystem interface 230 and second antenna subsystem interface 260. As yet another example, a third optical transmission path 283 can be provided in front protective plate layer 210 between third RF transceiver subsystem interface 240 and third antenna subsystem interface 270.

As another example, an optical transmission path can be provided in front clear plate layer 208 between RF transceiver subsystem interface 217 and antenna subsystem interface 247. As another example, a second optical transmission path can be provided in front clear plate layer 208 between second RF transceiver subsystem interface 227 and second antenna subsystem interface 257. As yet another example, a third optical transmission path can be provided in front clear plate layer 208 between third RF transceiver subsystem interface 237 and third antenna subsystem interface 267.

As yet another example, an optical transmission path can be provided in diffuser layer 202 between RF transceiver subsystem interface 212 and antenna subsystem interface 242. As yet another example, a second optical transmission path can be provided in diffuser layer 202 between second RF transceiver subsystem interface 222 and second antenna subsystem interface 252. As yet another example, a third optical transmission path can be provided in diffuser layer 202 between third RF transceiver subsystem interface 232 and third antenna subsystem interface 262.

While certain examples are described above with respect to certain layers, it should be appreciated that embodiments may utilize optical transmission paths through any one or more layers in which such transmission paths between at least one RF transceiver subsystem interface and at least one antenna subsystem interface may be implemented. Given the wavelengths of light, the dimensions with which an optical transmission path may be established need not be large relative to the dimensions of element, such as pixels, of which an image may be formed on the display panel. Optical transmission structures can be defined with very small height and width dimensions in one or more layers of the display panel. As an example, optical transmission structures can be provided using fabrication techniques similar to those used to provide TFTs in rear electrode layer 204. For example, materials used to fabricate TFTs, such as metal oxides, for example, indium tin oxide (ITO) can be deposited to form optical transmission paths along a layer, such as rear electrode layer 204. For example, a difference in a refractive index of the metal oxide material and a glass material may be used to form an optical transmission path.

As another example, a reflective metallic surface may be deposited to form an optical transmission path. A metallic material may be deposited on a surface of a layer of the display panel. As another example, a channel may be formed, for example, by removing material from a surface of a layer, for example, by etching. A refractive or reflective material, such as a metal oxide, metal, or metal alloy may be deposited on the surface of the channel to form the optical transmission path. A transparent material, such as a polymer material, having a different refractive index than the surrounding material may be deposited in the channel to form the optical transmission path.

As another example, given the bandwidths attainable using optical communication, an optical transmission path between at least one RF transceiver subsystem and at least one antenna subsystem need not be instantiated as multiple independent optical transmission paths, as they may with other embodiments. Rather, a panel may provide a single optical transmission path that couples at least one RF transceiver subsystem to at least one antenna subsystem, with multiplexing, such as wavelength division multiplexing or time division multiplexing, used to assure correct communication from any particular RF transceiver subsystem to any particular antenna subsystem. Thus, a layer or portion thereof of a display panel may be used as a light pipe to conduct optical signals among the at least one RF transceiver subsystem and the at least one antenna subsystem.

While the locations of RF transceiver subsystem interfaces 220, 230, 240, 217, 227, 237, 212, 222, and 232 and antenna subsystem interfaces 250, 260, 270, 247, 257, 267, 242, 252, and 262 are shown with respect to particular edges of display panel 200, it should be appreciated that RF transceiver subsystem interfaces and antenna subsystem interface may be disposed along any edge or edges of display panel 200. As one example, antenna subsystem interfaces may be disposed along a left edge, a top edge, and a right edge of display panel 200, and an RF transceiver subsystem interface may be disposed along a bottom edge of display panel 200.

Figure 3:
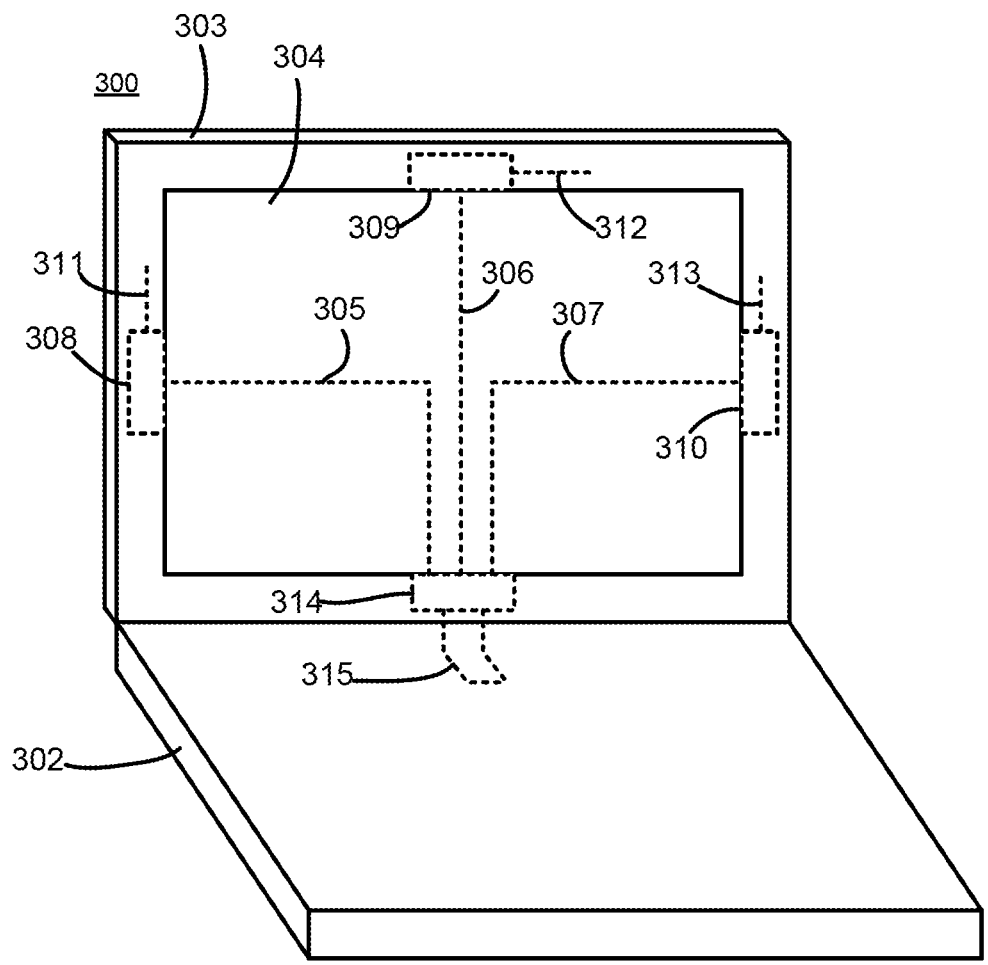
FIG. 3 is a perspective view diagram illustrating an information handling system including a display panel according to an embodiment of the present disclosure.

FIG. 3 shows information handling system 300 having a processor portion 302 and a display portion 303. Display portion 303 includes display 304, antenna subsystem 308, antenna subsystem 309, and antenna subsystem 310. An RF transceiver subsystem 314, with RF transceiver subsystem interconnect 315 providing a connection to processor portion 302, is illustrated as being in display portion 303 but may alternatively be in processor portion 302. Antenna subsystem 308 includes antenna 311. Antenna subsystem 309 includes antenna 312. Antenna subsystem 310 includes antenna 313. Display panel 304 provides an optical transmission path 305 between RF transceiver subsystem 314 and antenna subsystem 308. Display panel 304 provides an optical transmission path 306 between RF transceiver subsystem 314 and antenna subsystem 309. Display panel 304 provides an optical transmission path 307 between RF transceiver subsystem 314 and antenna subsystem 310.

RF transceiver subsystem 314 receives electrical signals via RF transceiver subsystem interconnect 315 and provides optical signals modulated according to the electrical signals for communication via display 304 to one or more of antenna subsystems 308, 309, and 310. Antenna subsystems 308, 309, and 310 receive the modulated optical signals from RF transceiver subsystem 314 via display 304 and provide RF electrical signals to antennas 311, 312, and 313, respectively, for wireless transmission.

For wireless reception, antenna subsystems 308, 309, and 310 receive RF electrical signals via antennas 311, 312, and 313, respectively. Antenna subsystems 308, 309, and 310 provide optical signals modulated according to the received electrical signals for communication via display 304 to RF transceiver subsystem 314. RF transceiver subsystem 314 receives the modulated optical signals from antenna subsystems 308, 309, and 310 via display 304 and provides electrical signals for communication via RF transceiver subsystem interconnect 315.

Figure 4:
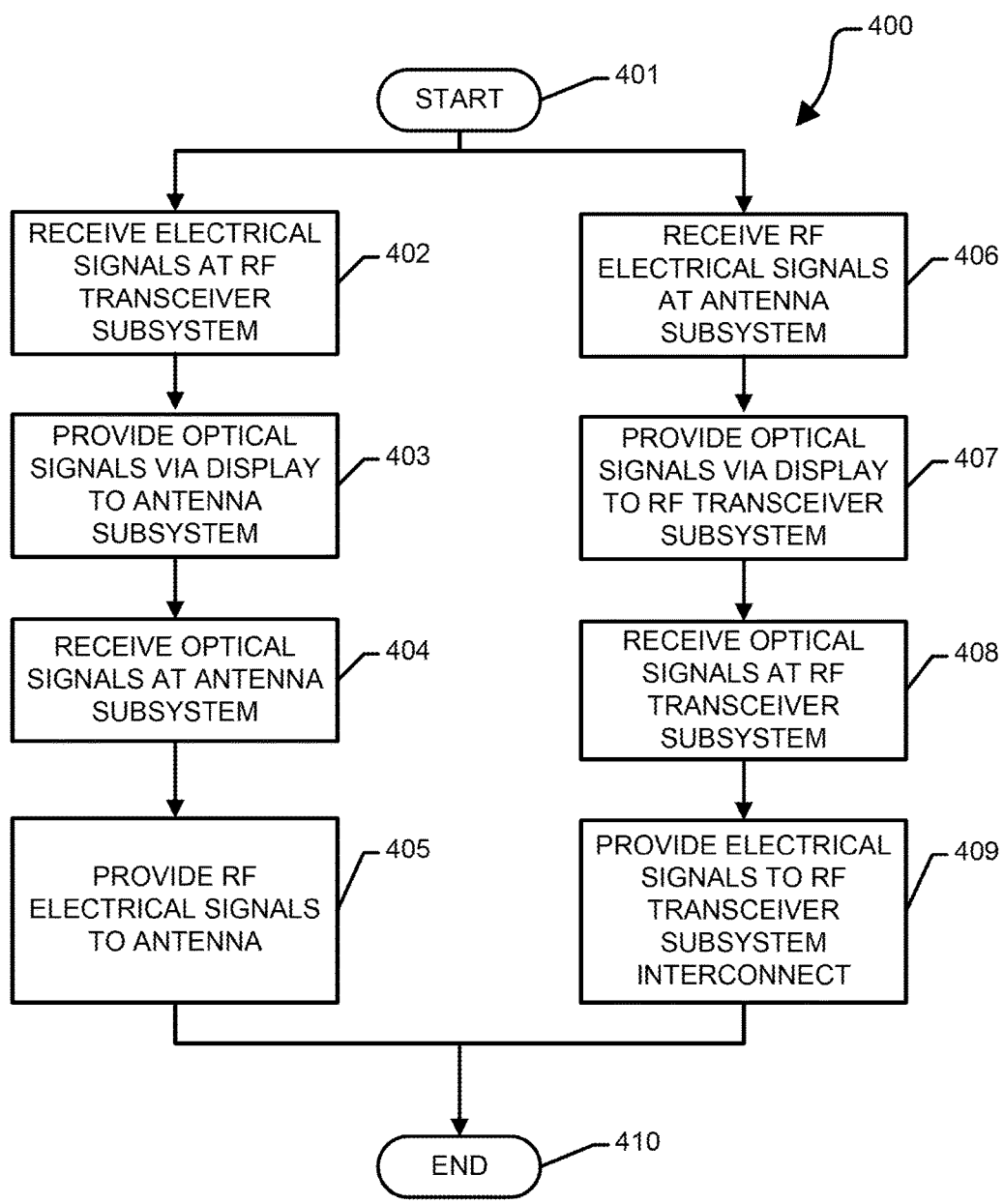
FIG. 4 is a flow diagram illustrating a method of optically communicating signals for wireless networking through a display panel according to an embodiment of the present disclosure.

FIG. 4 shows a method of optically communicating signals for wireless networking through a display panel according to an embodiment of the present disclosure. Method 400 begins at block 401 and continues to block 402 to transmit wireless communications or to block 406 to receive wireless communications. For transmitting wireless communications, at block 402, a transmit electrical signal is received at an RF transceiver subsystem. For example, the transmit electrical signal may be received from another component of an information handling system, such as from a microprocessor, via an RF transceiver subsystem interconnect. From block 402, method 400 continues to block 403. At block 403, the RF transceiver subsystem provides a transmit optical signal modulated with the transmit electrical signal via a transmit optical path of the display panel to an antenna subsystem. From block 403, method 400 continues to block 404. At block 404, the antenna subsystem receives the transmit optical signal via the transmit optical path of the display panel. From block 404, method 400 continues to block 405. At block 405, the antenna subsystem provides a transmit RF electrical signal obtained by demodulating the transmit optical signal to an antenna for wireless communication. From block 405, the transmit portion of method 400 continues to block 410, where it ends.

For receiving wireless communications, method 400 begins at block 401 and continues to block 406. At block 406, a receive RF electrical signal is received at the antenna subsystem via the antenna. From block 406, method 400 continues to block 407. At block 407, the antenna subsystem provides a receive optical signal via a receive optical path of the display panel to the RF transceiver subsystem. From block 407, method 400 continues to block 408. At block 408, the RF transceiver subsystem receives the receive optical signal via the receive optical path of the display panel. From block 408, method 400 continues to block 409. At block 409, the RF transceiver subsystem provides a receive electrical signal via an RF transceiver subsystem interconnect to another element of the information handling system, for example, to a microprocessor. The RF transceiver subsystem can obtain the receive electrical signal by demodulating the receive optical signal and further processing the signal, for example, extracting data from the signal. Thus, the receive electrical signal may be, for example, a data signal, as opposed to an RF signal. From block 409, the receive portion of method 400 continues to block 410, where it ends.

While only one pass for transmission and one pass for reception from block 401 to block 410 are described above, it should be understood that multiple passes through the flow diagram, for transmission, reception, or both, may be performed serially, concurrently, or both. While only one antenna subsystem is described above, it should be understood that the method may be performed with respect to a plurality of antenna subsystems, which can provide wireless communication using a respective plurality of antennas. Such antenna subsystems may be located in proximity to each other, for example, along a common edge of the display panel, or may be located diversely, for example, along multiple edges of the display panel.

The method may further comprise communication of supervisory signals, for example, supervisory signals from the RF transceiver subsystem to the antenna subsystem and supervisory signals from the antenna subsystem to the RF transceiver subsystem. The supervisory signals may be communicated, for example, as optical signals via the display panel.

The method may include, for example, wavelength division multiplexing through a display panel layer of the display panel first transmit signals to the antenna subsystem, second transmit signals to a second antenna subsystem, and third transmit signals to a third antenna subsystem, wherein the first antenna subsystem is located along a first edge of the display panel, the second antenna subsystem is located along a second edge of the display panel, and the third antenna subsystem is located along a third edge of the display panel.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a radio frequency (RF) transceiver subsystem;
   an antenna subsystem; and
   a display panel for displaying graphic images, the display panel including an optical communication channel coupled to the RF transceiver subsystem and the antenna subsystem, the optical communication channel for communicating transmit signals from the RF transceiver subsystem to the antenna subsystem and for communicating receive signals from the antenna subsystem to the RF transceiver subsystem.

2. The information handling system of claim 1, wherein the optical communication channel is disposed in a transparent pane of the display panel.

3. The information handling system of claim 2, wherein the optical communication channel is disposed peripheral to a viewable portion of the display panel on which the graphic images are to be displayed.

4. The information handling system of claim 1, wherein the transmit signals comprise multiple RF band transmit signals of a plurality of RF bands and the receive signals comprise multiple RF band receive signals of a plurality of RF bands.

5. The information handling system of claim 1, wherein the optical communication channel is for communicating supervisory signals between the RF transceiver subsystem and the antenna subsystem in addition to communicating the transmit signals and the receive signals.

6. The information handling system of claim 1, wherein the optical communication channel wavelength division multiplexes first transmit signals to the antenna subsystem, second transmit signals to a second antenna subsystem, and third transmit signals to a third antenna subsystem, wherein the first antenna subsystem is located along a first edge of the display panel, the second antenna subsystem is located along a second edge of the display panel, and the third antenna subsystem is located along a third edge of the display panel.

7. The information handling system of claim 1, wherein the display panel further comprises:
   a second optical communication channel for communicating second transmit signals from the RF transceiver subsystem to a second antenna subsystem and for communicating second receive signals from the second antenna subsystem to the RF transceiver subsystem; and
   a third optical communication channel for communicating third transmit signals from the RF transceiver subsystem to a third antenna subsystem and for communicating third receive signals from the third antenna subsystem to the RF transceiver subsystem.

8. A display panel comprising:
   an array of image display elements for displaying graphic images; and
   an optical communication channel providing a radio frequency (RF) transceiver subsystem interface for coupling the optical communication channel to an RF transceiver subsystem and an antenna subsystem interface for coupling the optical communication channel to an antenna subsystem, the optical communication channel for communicating transmit signals from the RF transceiver subsystem interface to the antenna subsystem interface and for communicating receive signals from the antenna subsystem interface to the RF transceiver subsystem interface.

9. The display panel of claim 8, wherein the optical communication channel is disposed in a transparent pane of the display panel.

10. The display panel of claim 9, wherein the optical communication channel is disposed peripheral to a viewable portion of the display panel on which the graphic images are to be displayed.

11. The display panel of claim 8, wherein the transmit signals comprise multiple RF band transmit signals of a plurality of RF bands and the receive signals comprise multiple RF band receive signals of a plurality of RF bands.

12. The display panel of claim 8, wherein the optical communication channel is for communicating supervisory signals between the RF transceiver subsystem and the antenna subsystem in addition to communicating the transmit signals and the receive signals.

13. The display panel of claim 8, wherein the optical communication channel wavelength division multiplexes first transmit signals to the antenna subsystem, second transmit signals to a second antenna subsystem, and third transmit signals to a third antenna subsystem, wherein the first antenna subsystem is located along a first edge of the display panel, the second antenna subsystem is located along a second edge of the display panel, and the third antenna subsystem is located along a third edge of the display panel.

14. The display panel of claim 8, wherein the display panel further comprises:
   a second optical communication channel for communicating second transmit signals from the RF transceiver subsystem to a second antenna subsystem and for communicating second receive signals from the second antenna subsystem to the RF transceiver subsystem; and
   a third optical communication channel for communicating third transmit signals from the RF transceiver subsystem to a third antenna subsystem and for communicating third receive signals from the third antenna subsystem to the RF transceiver subsystem.

15. A method comprising:
   receiving a transmit electrical signal at a radio frequency (RF) transceiver subsystem, the RF transceiver optically coupled to an edge of an optical path through a display panel layer;
   providing at the RF transceiver subsystem a transmit optical signal modulated according to the transmit electrical signal for communication via the optical path through the display panel layer;
   receiving at an antenna subsystem the transmit optical signal communicated via the transmit optical path through the display panel layer; and
   providing at the antenna subsystem, a transmit RF electrical signal to an antenna for wireless transmission.

16. The method of claim 15, further comprising:
   receiving at the antenna subsystem a receive RF electrical signal via the antenna;
   providing at the antenna subsystem a receive optical signal for communication via a receive optical path through the display panel layer;
   receiving at the RF transceiver subsystem the receive optical signal communicated via the receive optical path through the display panel layer; and
   providing at the RF transceiver subsystem a receive electrical signal to an RF transceiver subsystem interconnect.

17. The method of claim 15, wherein the optical communication channel is disposed in a transparent pane of the display panel.

18. The method of claim 15, wherein the transmit optical path and the receive optical path are disposed peripheral to a viewable portion of the display panel on which the graphic images are to be displayed.

19. The method of claim 15, wherein the transmit RF electrical signals comprise multiple RF band transmit electrical signals of a plurality of RF bands and the receive RF electrical signals comprise multiple RF band receive electrical signals of a plurality of RF bands.

20. The method of claim 15, wherein the receiving at an antenna subsystem the transmit optical signal communicated via the transmit optical path through the display panel layer and the providing at the antenna subsystem, a transmit RF electrical signal to an antenna for wireless transmission are performed for a plurality of antenna subsystems and a respective plurality of antennas.

* * * * *